US010217157B2

(12) United States Patent
Novotny et al.

(10) Patent No.: US 10,217,157 B2
(45) Date of Patent: *Feb. 26, 2019

(54) SERVICE PERSONALIZATION WITH FAMILIARITY SENSITIVITY (71) Applicant: Microsoft Technology Licensing, LLC, Redmond, WA (US)

(72) Inventors: Margaret JoAnn Novotny, Greenbrae, CA (US); Blaise Aguera y Arcas, Seattle, WA (US); Jeffery David Howard, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

This patent is subject to a terminal disclaimer.

(21) Appl. No.: 15/365,153

(22) Filed: Nov. 30, 2016

(65) Prior Publication Data
US 2017/0083964 A1 Mar. 23, 2017

Related U.S. Application Data (63) Continuation of application No. 14/498,846, filed on Sep. 26, 2014.

(51) Int. Cl.
G06F 7/04 (2006.01)
G06F 17/30 (2006.01)
(Continued)

(52) U.S. Cl.
CPC ... *G06Q 30/0631* (2013.01); *G06F 17/30876* (2013.01); *G06Q 30/0269* (2013.01);
(Continued)

(58) Field of Classification Search
CPC .................. G06F 21/6245; G06F 17/30876
(Continued)

(56) References Cited

U.S. PATENT DOCUMENTS 7,010,570 B1 * 3/2006 Boies .................. G06Q 30/018
705/317
7,539,656 B2 5/2009 Fratkina et al.
(Continued)

OTHER PUBLICATIONS

Ido Guy; Social Media Recommendation based on People and Tags; IBM; 1995; p. 164-201.*
(Continued)

*Primary Examiner* — Monjur Rahim
(74) *Attorney, Agent, or Firm* — The Law Office of Michael E. Kondoudis (57) ABSTRACT Personalized services often utilize individual profiles, such as social network profiles, product purchase histories, or browsing histories. However, personalization may exhibit or imply a familiarity level between the service and the individual that is beyond the individual's comfort level. Presented herein are techniques for adapting personalized services to request supplemental individual information only within a current familiarity stage that has been established by the individual with the service, and only to provide a requested usage of a service. Such solicitation may inform the intended usage of the requested information. Usages that may involve more sensitive information may be predicated upon requesting and receiving individual consent from the individual to advance to a higher familiarity stage. The user may be permitted to provide individual consent to advancing to a higher familiarity stage only for a particular service, and/or only temporarily for a particular usage of the service.

21 Claims, 8 Drawing Sheets (51) Int. Cl.
  *H04N 7/16* (2011.01)
  *G06Q 30/06* (2012.01)
  *G06Q 30/02* (2012.01)
  *H04L 29/08* (2006.01)
  *G06Q 50/00* (2012.01)

(52) U.S. Cl.
  CPC ....... *G06Q 30/0271* (2013.01); *H04L 67/306* (2013.01); *G06Q 50/01* (2013.01)

(58) Field of Classification Search
  USPC .......................................................... 726/28
  See application file for complete search history.

(56) References Cited

U.S. PATENT DOCUMENTS

| | | | |
|---|---|---|---|
| 8,156,135 B2* | 4/2012 | Chi ................... | G06F 17/30864 707/765 |
| 2005/0234939 A1* | 10/2005 | Arend ................... | G06F 9/4446 |
| 2009/0216563 A1 | 8/2009 | Sandoval et al. | |
| 2009/0254971 A1* | 10/2009 | Herz ....................... | G06Q 10/10 726/1 |
| 2010/0031335 A1* | 2/2010 | Handler ................ | H04L 9/3226 726/8 |
| 2013/0097153 A1* | 4/2013 | Barbieri ............ | G06F 17/30817 707/722 |
| 2013/0159110 A1 | 6/2013 | Rajaram et al. | |
| 2014/0081913 A1* | 3/2014 | Peri ................... | G06F 17/30581 707/610 |
| 2014/0223575 A1* | 8/2014 | Nandi ................. | G06Q 30/0282 726/27 |
| 2015/0052121 A1* | 2/2015 | Sharifi ............... | G06Q 30/0631 707/723 |
| 2015/0262282 A1* | 9/2015 | Walti ................. | G06Q 30/0631 705/26.7 |
| 2016/0092695 A1 | 3/2016 | Novotny et al. | |

OTHER PUBLICATIONS

Hochleitner, et al., "Making Devices Trustworthy: Security and Trust Feedback in the Internet of Things", In Proceedings of the Fourth International Workshop on Security and Privacy in Spontaneous Interaction and Mobile Phone Use, Jun. 18, 2012, 6 pages, http://www.medien.ifi.lmu.de/iwssi2012/papers/iwssi-spmu2012-hochleitner.pdf.

Gotz, et al., "Privacy-Aware Personalization for Mobile Advertising", In Proceedings of the ACM Conference on Computer and Communications Security, Aug. 2011, 14 pages, http://research.microsoft.com/pubs/152497/01main.pdf.

Bradley, Steven, "Progressive Disclosure: Presenting Information on a Need to Know Basis", Published on: Jun. 14, 2010, pp. 15, Available at: http://www.vanseodesign.com/web-design/progressive-discolosure/.

Brosso, et al., "Known User Continuous Authentication System for Consumer Application Software", In Proceedings of the 7th IEEE Conference on Consumer Communications and Networking Conference, Jan. 9, 2010, 2 pages, http://ieeexplore.ieee.org/stamp/stamp.jsp?tp=&arnumber=5421607.

Chakraborty, et al., "Allowing Finer Control Over Privacy Using Trust as a Benchmark", In Proceedings of the IEEE Information Assurance Workshop, Jun. 21, 2006, 8 pages, http://ieeexplore.ieee.org/stamp/stamp.jsp?tp=&arnumber=1652082.

"Final Office Action Issued in U.S. Appl. No. 14/498,846", dated Aug. 10, 2016, 11 Pages.

"Non Final Office Action Issued in U.S. Appl. No. 14/498,846", dated Jan. 15, 2016, 13 Pages.

"Notice of Allowance Issued in U.S. Appl. No. 14/498,846", dated Sep. 30, 2016, 12 Pages.

Saxena et al., "Secure Device Pairing based on a Visual Channel", 2011, pp. 1-17, Nokia Research Center, Helsinki, Finland.

* cited by examiner

SERVICE PERSONALIZATION WITH FAMILIARITY SENSITIVITY

BACKGROUND

Within the field of computing, many scenarios involve the provision of one or more personalized services for individuals based on individual profiles of the individuals. As a first example, the individual profile may comprise a purchase history of products and services that the individual has researched or purchased, and the service may present recommendations to the individual that are based on the previously selected products and services. As a second example, the individual profile may comprise a social network profile, and the provision of services may be personalized based on the information in the social network profile. As a third example, the individual profile may comprise facts about individual interests expressed by and/or inferred from the individual's actions, such as web browsing, and the services may comprise advertisements that are personalized based on the individual interests.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While the provision of personalized services may present opportunities for more relevant and persuasive services, some undesirable scenarios may result from such techniques based on personalization that are beyond a comfort level of the individual. Such scenarios may arise if the receipt, usage, and/or presentation of individual information is not performed in view of the potential sensitivity of the information to the individual, and/or the level of familiarity with which the individual wishes to engage the services. As a first example, a first product may be generally purchased by consumers for a variety of health conditions, including a sensitive health condition that is also correlated with a second product. A naïve product recommendation service that is informed by such correlation may recommend the second product to an individual who purchases the first product, and may inadvertently imply that the sensitive health condition applies to the individual. As a second example, a social network profile may include private information that the individual may not wish to extend beyond the social circle, and a service utilizing the social network profile may inadvertently expose the private information of the individual outside of the social network. As a third example, an advertising service may inadvertently utilize information based on information that the individual may have regarded as private, and that the individual is not comfortable having shared with the advertising service. In these scenarios, the uses of the individual's information may inadvertently cause discomfort due to correct inferences that the individual wished to keep private (i.e., personalized services exhibiting a level of familiarity beyond the individual's comfort level), and/or offense due to incorrect inferences of sensitive topics to the individual.

Presented herein are techniques for providing personalized services that are adapted to the familiarity with which the individual is comfortable and to which the individual has consented. In accordance with these techniques, an individual profile may contain information about the individual that enables the provision of personalized services within a selected familiarity stage. If a usage of the service involves supplemental individual information that is absent from the individual profile but on a comparable level of familiarity with previously disclosed information, the service may freely request, receive, store, and utilize the information. However, if the supplemental individual information is beyond a previously established level of familiarity, the service may conservatively request only the supplemental individual information that is related to the usage of the service, and may also inform the individual of the usage of the supplemental individual information by the service (e.g., explaining why the supplemental individual information is being sought). If the individual refuses to provide the supplemental individual information, the service may endeavor to fulfill the usage in the absence of the supplemental individual information (and, in some embodiments, may refrain from requesting the supplemental individual information in future usages). However, if the individual provides the supplemental individual information, the service may endeavor to provide the usage and promptly present results to the individual that demonstrate the value of the supplemental individual information. Additionally, such requests and uses may be structured according to a set of familiarity stages (e.g., an anonymous familiarity stage involving no personalized individual information; an impersonal familiarity stage, involving only the information that the individual has disclosed in a current interaction; a semi-familiar familiarity stage, involving non-sensitive information, such as the individual's basic social network profile; and a familiar familiarity stage, involving sensitive information such as the individual's health record), and may only request information within a selected familiarity stage. Information that is beyond the selected familiarity stage may be contingent upon receiving an individual consent from the individual to advance to a higher familiarity stage; e.g., before requesting specific details about an individual's health record, a user interface may first request confirmation that the individual is comfortable discussing his or her health record, and may present specific questions only upon receiving individual consent to advance the higher familiarity stage. Structuring the collection and use of information about the individual in these and other ways may inform services in a more socially adept manner that reduces discomfort and/or offense over the uses of the individual's information in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Figure 1:
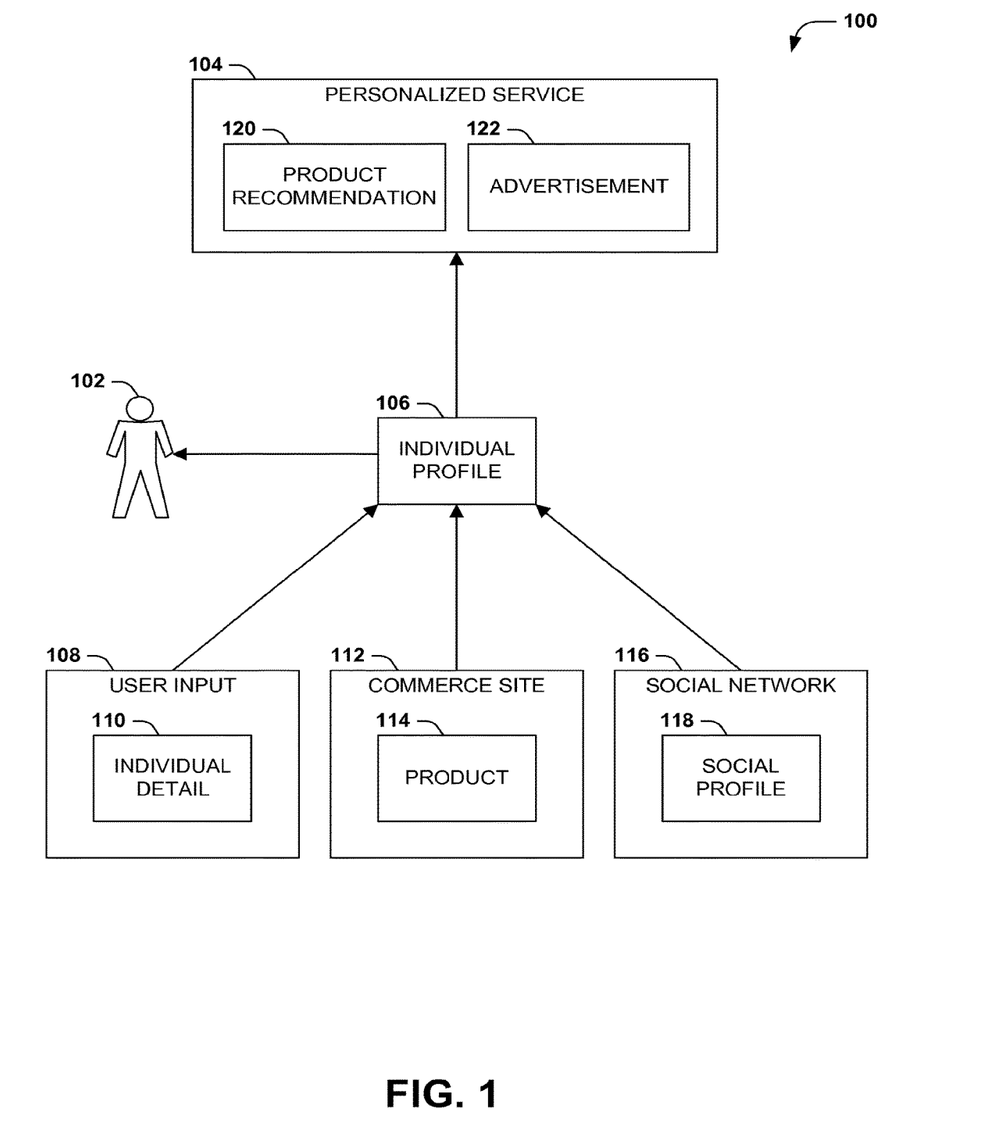
FIG. 1 is an illustration of an exemplary scenario featuring a compilation of an individual profile of an individual from a variety of data sources and its use in providing a variety of personalized services.

FIG. 1 presents an illustration of an exemplary scenario 100 featuring the provision of a personalized service 104 for an individual 102 based on the contents of an individual profile 106. In this exemplary scenario 100, the individual profile 106 is aggregated from a variety of sources, including individual details 110 specified by the individual 102 as user input 108; a purchase history by the individual 102 of products 114 through a commerce site 112; and a social profile 118 of the individual 102 compiled from interaction with other individuals in a social network 116. The service 104 may be personalized for the individual 102 based on the contents of the individual profile 106; e.g., product recommendations 120 may be provided based on other products 114 that the individual 102 has previously purchased, and targeted advertisements 122 may be tailored to the contents of the individual profile 106 to achieve more persuasive advertising.

However, within such exemplary scenarios, automated use of information in the individual profile 106 of the individual 102 may occasionally result in discomfort or offense of the individual 102. For example, some portions of the individual profile 106 may be sensitive, such as the individual's financial status, health record, relationship history, and personal tastes. The individual 102 may wish to have some of this information used only by some services 104 and not shared with others, or may wish to have this information used only in particular ways. In some scenarios, information in the individual profile 106 may have been identified from activities that the individual 102 believed to be private, and wishes not to be shared with any service 104. As another example, some information in the individual profile 106 may be out of date or inaccurate, and the personalization of services 104 based on such details may be undesirable to the individual 102. Additionally, some more proactive services 104 may ask information that the individual 102 may not be willing to share (possibly not in the current context of the individual 102, such as a public location), creating anxiety and possibly prompting the individual 102 to provide incorrect information, or may attempt to provide personalization based on inferences about the individual 102 that, while statistically likely, may not be true for this individual 102. While these scenarios often arise in human interaction and are often handled through social cues and tact, such considerations are not typically utilized in the automated handling of individual profiles 102 by personalized services 104, occasionally creating uncomfortable and offensive interactions with individuals 102.

Figure 2:
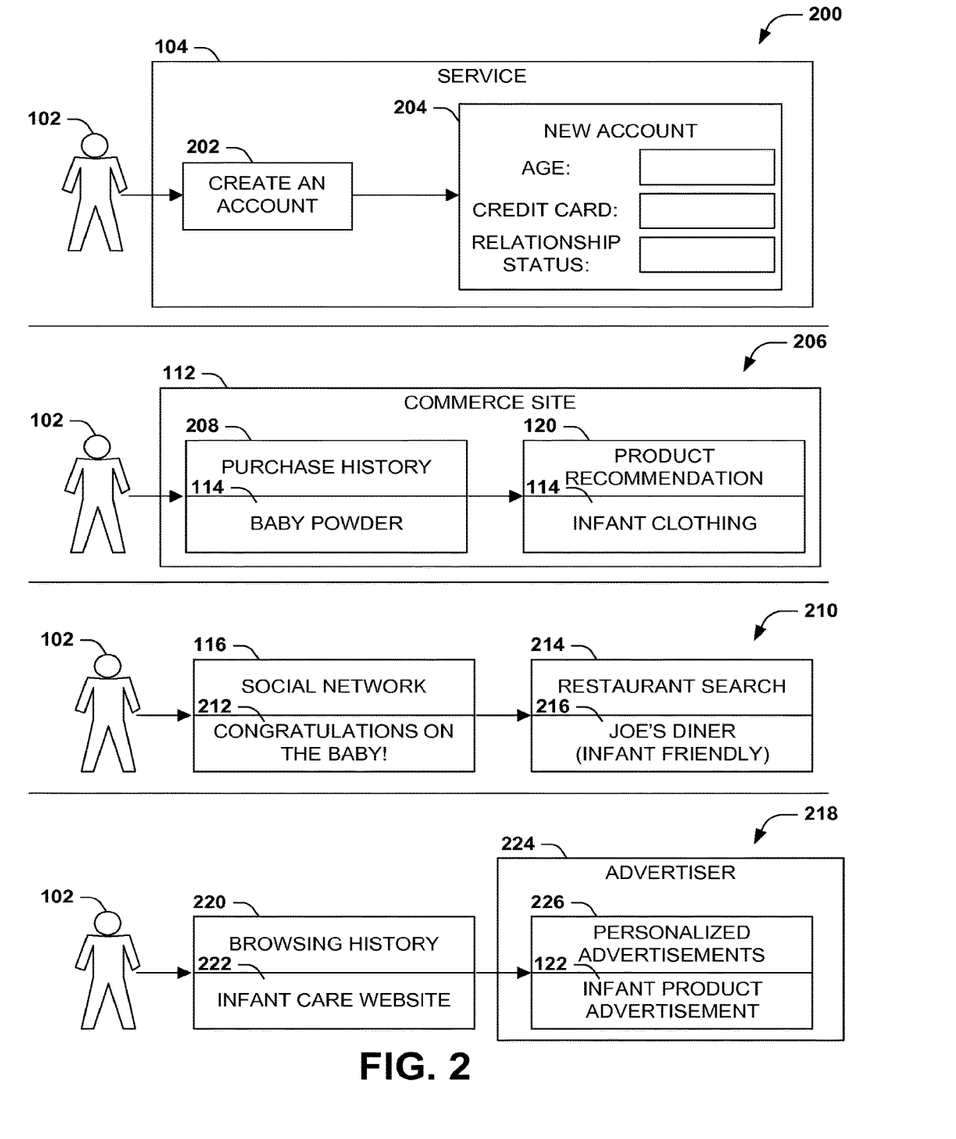
FIG. 2 is an illustration of several exemplary scenarios featuring uses of the information in an individual profile of an individual that exceed a comfort level of the individual in the manner of using the individual profile.

FIG. 2 presents illustrations of some exemplary scenarios wherein the personalization of services 104 may undesirably affect interactions with an individual 102. In a first exemplary scenario 200, an individual 102 may indicate an interest in utilizing a service 104, and the service 104 may present to the individual 102 a request 202 to create an individual profile 106, and may present a signup form 204 for the individual profile 106 requesting a variety of information, such as the age of the individual 102, the credit card number of the individual 102, and the relationship status of the individual 102. Because the individual 102 has not yet developed a relationship with the service 104, the individual 102 may not yet be comfortable disclosing some or all of this information, and may instead opt not to utilize the service 104.

FIG. 2 also presents a second exemplary scenario 206, wherein an individual 102 utilized a commerce site 112 to purchases a product 114, such as baby powder, which has a variety of uses for personal hygiene and infant care. The product 114 may be added to the purchase history 208 of the individual 102, and the commerce site 112 may endeavor to produce a product recommendation 120 of a second product 114 that may be of interest to the individual 102. One such technique involves identifying correlations of products 114 that are often purchased together. The commerce site 112 may automatically determine that some individuals 102 (particularly, parents with infants) often purchase baby clothing with baby powder, and recommend that the individual 102 may be interested in purchasing baby clothing. However, this inference may be incorrect if the individual 102 has acquired baby powder for a different use, such as personal hygiene, and the individual 102 may be confused or offended by the suggestion. Alternatively, this inference may be correct, but the individual 102 may not have predicted disclosing this fact simply through the purchase of baby powder. In either case, the automated inference may create discomfort or irritation for the individual 102. Notably, in this exemplary scenario 206, the individual 102 may have provided individual consent to reveal some sensitive information to the commerce site 112 (e.g., credit card information), but may not be comfortable sharing other sensitive information with the commerce site 112 (e.g., the individual's parenting status).

FIG. 2 also presents a third exemplary scenario 210, involving an interaction of the individual 102 with a social network 116, wherein an acquaintance of the individual 102 may send a message 212 to the individual 102 referring to an infant. A service or device may add this information to the individual profile 106 of the individual 102, and may attempt to personalize other services 104 based on this information; e.g., a restaurant search 214 may provide a recommendation 216 that is compatible with the individual profile 106 of the individual 102, including restaurants that are infant-friendly. However, the individual 102 may have been comfortable discussing this aspect in the context of a social network 116, but may not have wished the information to be shared or utilized in other contexts, including a restaurant search 214. The apparent dissemination of information outside of the context in which the individual 102 disclosed the information may therefore result in discomfort or irritation for the individual 102.

FIG. 2 also presents a fourth exemplary scenario 218, involving activities of an individual 102 that may be monitored for the inference of details for addition to the individual profile 106. For example, a browsing history 220 of the individual 102 may include a visit to a website 222 providing information about infant care. An advertiser 224 may monitor the browsing history 220 and may utilize advertisement personalization techniques 226 to generate a targeted advertisement 122 referring explicitly to the individual 102 in the context of parenting. However, the individual 102 may have considered web browsing as a completely private and/or anonymous activity, and may not have provided individual consent to the disclosure or inference of any information from the browsing history 220. The appearance of targeted advertisements 122 based on such inferences may be alarming or disruptive of the privacy of the individual 102.

B. Presented Techniques

Social difficulties arising from the automated compilation and use of an individual profile 106, including those illustrated in the exemplary scenarios of FIG. 2, may arise from the personalization of services 104 based on the contents of an individual profile 106, in the absence of evaluation of the nature and sensitivity of the compiled information, and the level of familiarity that the individual 102 has provided individual consent to develop with the service 104. Instead, it may be advantageous to configure services 104 to evaluate the level of familiarity in the relationship developed between the individual 102 and the service 104, and to adjust the requesting, use, and disclosure of individual details 110 based on the familiarity of the relationship. By requesting only information in accordance with the consented familiarity of this relationship and only when applicable to a requested usage of the service 104 by the individual 102, while also explaining how the requested information is to be used, the service 104 may build trust with the individual 102 that encourages the advancement of the familiarity of the relationship.

Figure 3:
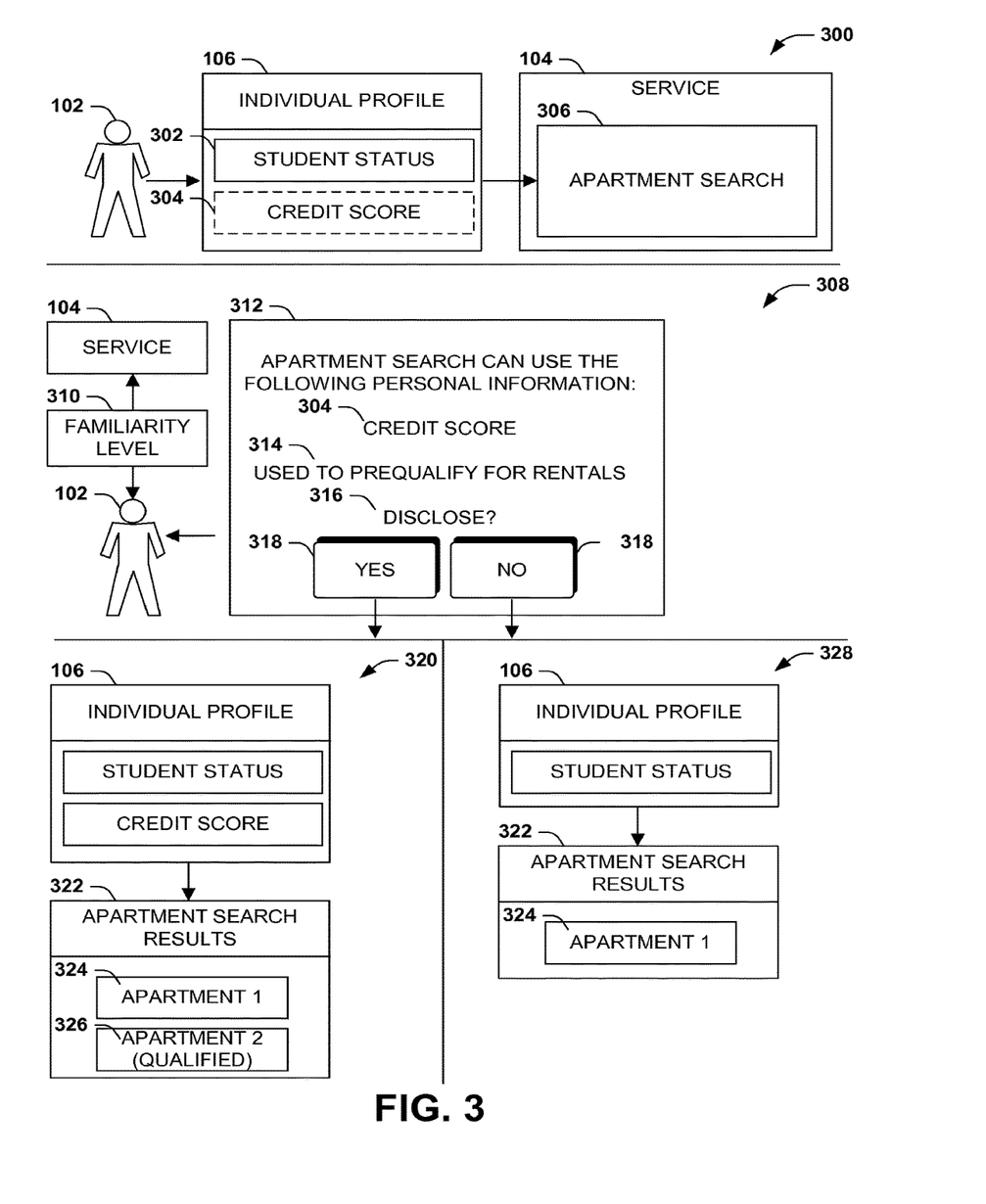
FIG. 3 is an illustration of an exemplary scenario featuring the generation and use of an individual profile in view of the sensitivity of the disclosed information in accordance with the techniques presented herein.

FIG. 3 presents an illustration of an exemplary scenario featuring the personalization of a service 104 in view of a familiarity level 310 established by the individual 104 with the service 104. In this exemplary scenario, at a first time point 300, the individual 102 may request a usage of a service 104, such as an apartment search 306 to be performed with a particular set of details. While interacting with the individual 102, the service 104 may seek to utilize an individual profile 106 containing some individual information 302 (e.g., the status of the individual 102 as a student), and also some supplemental individual information 304 that is absent from the individual profile 106, such as the credit score of the individual 102, which may be sensitive to the individual 102, but which may enable some usages of the service 104. However, at the first time point 300, the usage of the service 104 by the individual 102 may not involve the supplemental individual information 106, and the service 104 may not yet have requested the supplemental individual information 106.

As further illustrated in the exemplary scenario 300 of FIG. 3, at a second time point 308, a requested usage of the service 104 by the individual 102 may involve the supplemental individual information 304. For example, the service 104 may determine that at least one apartment arising in the apartment search 306 is only to be displayed to individuals 102 who prequalify based on a sufficiently trustworthy credit score. Recognizing that the supplemental individual information 304 may now be applicable to the provision of the usage of the service 104, a determination may be made whether the supplemental individual information 304 is within a familiarity level 310 established by the individual 102 with the service 104. If not, then the service 304 may be provided to the individual 102 without the supplemental individual information 304. However, if the supplemental individual information 304 may be requested from the individual 102 in order to provide the service 104 for the individual 102. For example, the service 104 may present a notification 312 that the requested usage may be more completely fulfilled if the individual 102 discloses the supplemental individual information 304. The notification 312 may also include an explanation of the usage 314 of the supplemental individual information 304 for the requested usage of the service 104 (e.g., indicating that the service 104 intends to use the credit score of the individual 102 to identify apartments in the apartment search 306 for which the individual 102 is prequalified due to a sufficiently trustworthy credit score). The notification 310 may also include a request 316 for the supplemental individual information 304, and options 318 for disclosing and not disclosing the supplemental individual information 304.

As further illustrated in the exemplary scenario of FIG. 3, if the individual 102 selects the option 318 of disclosing the supplemental individual information 304, the service 104 may, at a third time point 320, add the disclosed supplemental individual information 304 to the individual profile 106 of the individual 102, and may utilize the supplemental individual information 304 to fulfill the usage of the service 104. In some embodiments, the service 104 may promptly demonstrate to the individual 102 the value of having disclosed the supplemental individual information 304, such as the presentation of a search result set 322 including a first search result 324 that is not based on the supplemental individual information 304, and also a second search result 326 that is based on the supplemental individual information 304 and denoted as such (e.g., "Your credit score prequalifies you for this apartment"). However, if the individual 102 chooses the option 318 of not disclosing the supplemental individual information 304, the service 104 may, at a fourth time point 328, endeavor to fulfill the requested usage by maximizing the individual information 302 that is in the individual profile 106, and may therefore present a search result set 322 including a search result 324 based on the individual's student status, but omitting any search results 326 based on the absent supplemental individual information 304. Additionally, noting the individual's choice not to disclose the supplemental individual information 304, the service 104 may be configured to refrain from requesting the supplemental individual information 304 of the individual 102 again, but may simply maximize the information in the individual profile 106 of the individual 102 in order to provide the service 104 to the individual 102, unless and until the individual 102 indicates a later willingness to disclose the supplemental individual information to the service 104 (e.g., after developing a relationship with the service 104 that confers a level of trust, within which the individual 102 is comfortable disclosing the supplemental individual information). In this manner, the generation and use of the individual profile 106 of the individual 102 may be achieved in view of the familiarity level 310 established by the individual 102 with the service 104 in accordance with the techniques presented herein.

C. Exemplary Embodiments

Figure 4:
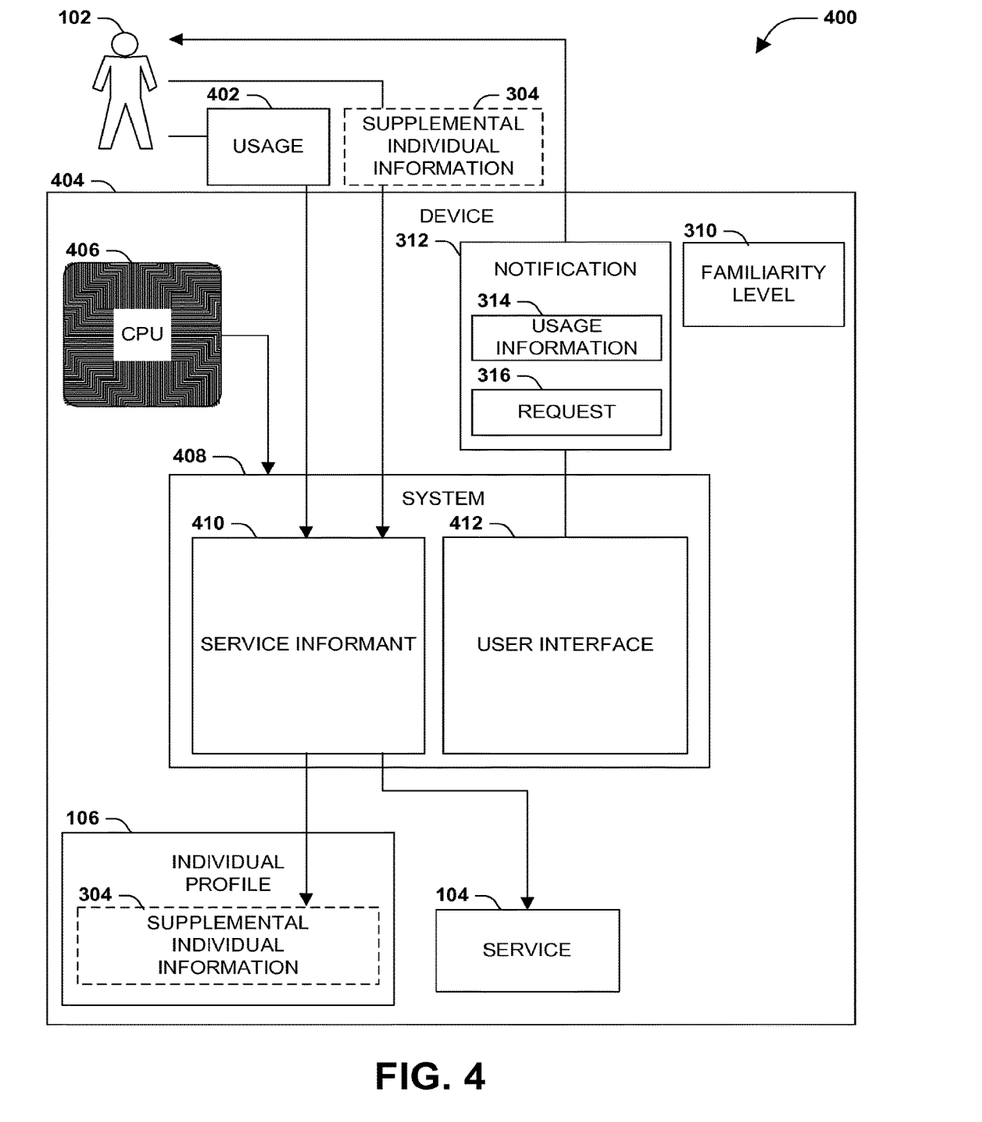
FIG. 4 is a component block diagram of an exemplary system configured to provide a service for an individual according to an individual profile and a familiarity level established by the individual with the service in accordance with the techniques presented herein.

FIG. 4 presents a first exemplary embodiment of the techniques presented herein, illustrated as an exemplary scenario 400 featuring an exemplary system 408 configured to cause a device 404 to provide one more services 104 for an individual 102, where the individual 102 has established a familiarity level 310 with the service 104. The exemplary system 408 may be implemented, e.g., as a set of components respectively comprising a set of instructions stored in a memory component of the device 404 having a processor 406 and having access to an individual profile 106 of at least one individual 102, where the instructions of respective components, when executed on the processor 406, cause the device 404 to perform respective portions of the techniques presented herein, such that the interoperation of the components causes the device 404 to operate according to the techniques presented herein.

The exemplary system 408 includes a service informant 410 that, upon receiving a request for a usage of the service 104 with the individual profile 106 of the individual 102, where the usage involves supplemental individual information that is absent from the individual profile 106, determines whether the supplemental individual information is within the familiarity level 310 established by the individual 102 with the service 104. If the supplemental individual information is within the familiarity level 310, the service informant 410 requests the supplemental individual information 304 from the individual 102, and, upon receiving the supplemental individual information 304, provides the service 104 for the individual 102 using the individual profile and the supplemental individual information 304. The exemplary system 408 also includes a user interface 412 that informs the individual 102 of the usage 314 of the supplemental individual information 304 by the service 104. For example, the user interface 412 may present to the individual 102 a notification 312 of the usage 314, and a request 316 to provide the supplemental individual information 304 for use in providing the service 104 for the individual 102. The user interface 412 may also include options allowing the individual 102 to specify whether to permit the usage 214 and provide the supplemental individual information 304, and/or to decline the usage 214, in which case the service 104 may be provided for the individual 102 in the absence of the supplemental individual information 304. In this manner, the components of the exemplary system 408 may interoperate to achieve the provision of the services 104 in view of the supplemental individual information 304 of the individual profile 106 in accordance with the techniques presented herein.

Figure 5:
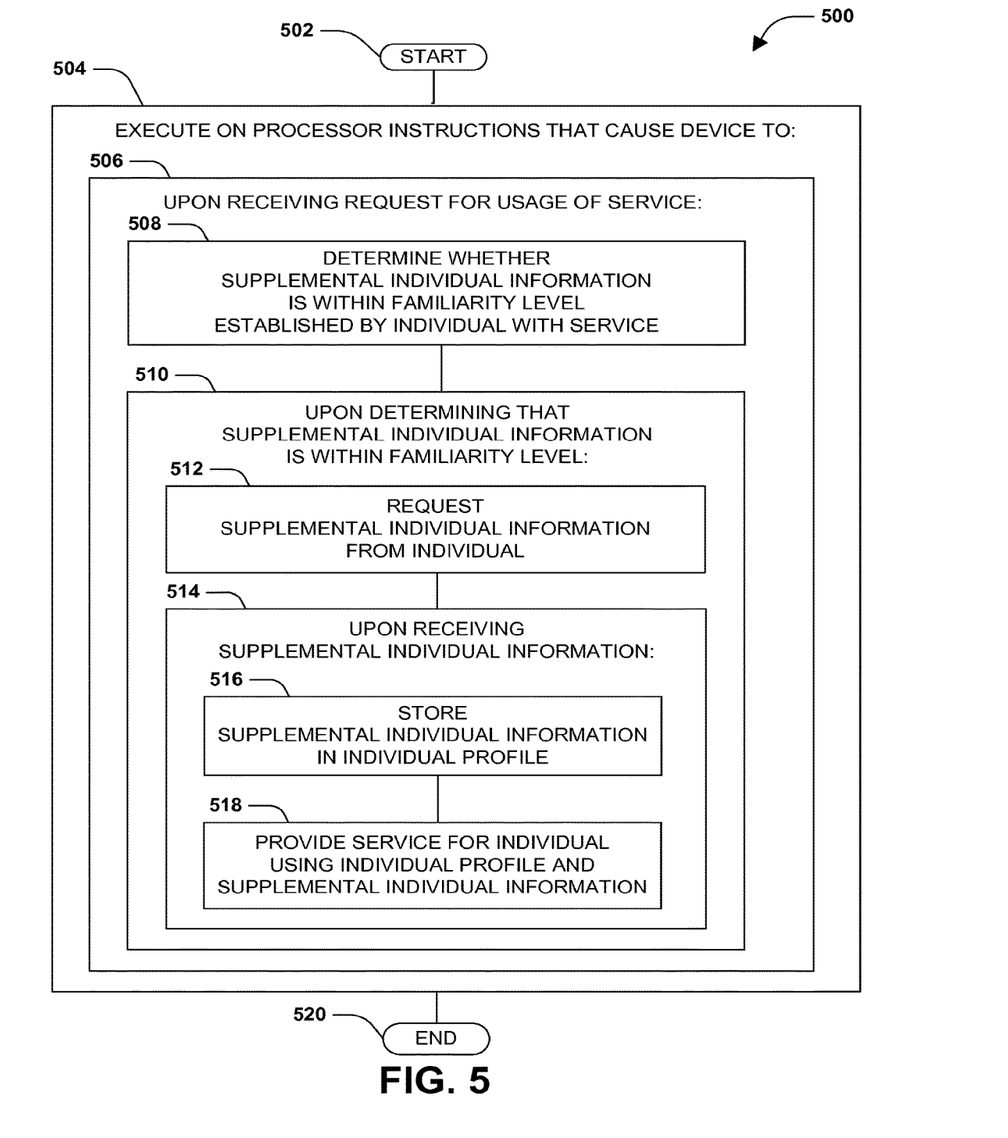
FIG. 5 is a flow diagram of an exemplary method of providing a service for an individual according to an individual profile and a familiarity level established by the individual with the service in accordance with the techniques presented herein.

FIG. 5 presents a second exemplary embodiment of the techniques presented herein, illustrated as an exemplary method 500 of providing services 104 for individuals 102 that are personalized based on an individual profile 106, and in view of a familiarity level 310 established by the individual 102 with the service 104. The exemplary method 500 may be implemented, e.g., as a set of instructions stored in a memory component of a device 404, such as a memory circuit, a platter of a hard disk drive, a solid-state storage device, or a magnetic or optical disc, and organized such that, when executed on a processor 406 of the device 404, cause the device 404 to operate according to the techniques presented herein.

The exemplary method 500 of FIG. 5 begins at 502 and involves executing 504 the instructions on a processor 406 of the device 404. Specifically, the instructions cause the device to, upon receiving 506 a request for a usage 402 of the service 104 that involves supplemental individual information that is absent from the individual profile, determine 508 whether the supplemental individual information is within the familiarity level 310 established by the individual with the service. Upon determining 510 that the supplemental individual information is within the familiarity level 310, the instructions further cause the device to request 512 the supplemental individual information from the individual; and upon receiving 514 the supplemental individual information, store 516 the supplemental individual information in the individual profile, and provide 518 the service for the individual 102 using the individual profile 106 and the supplemental individual information. In this manner, the exemplary method 500 achieves the configuration of the device 404 to generate and use the individual profile 106 of the individual 102 in order to provide the service 104 for the individual 102 in accordance with the techniques presented herein, and so ends at 520.

Figure 6:
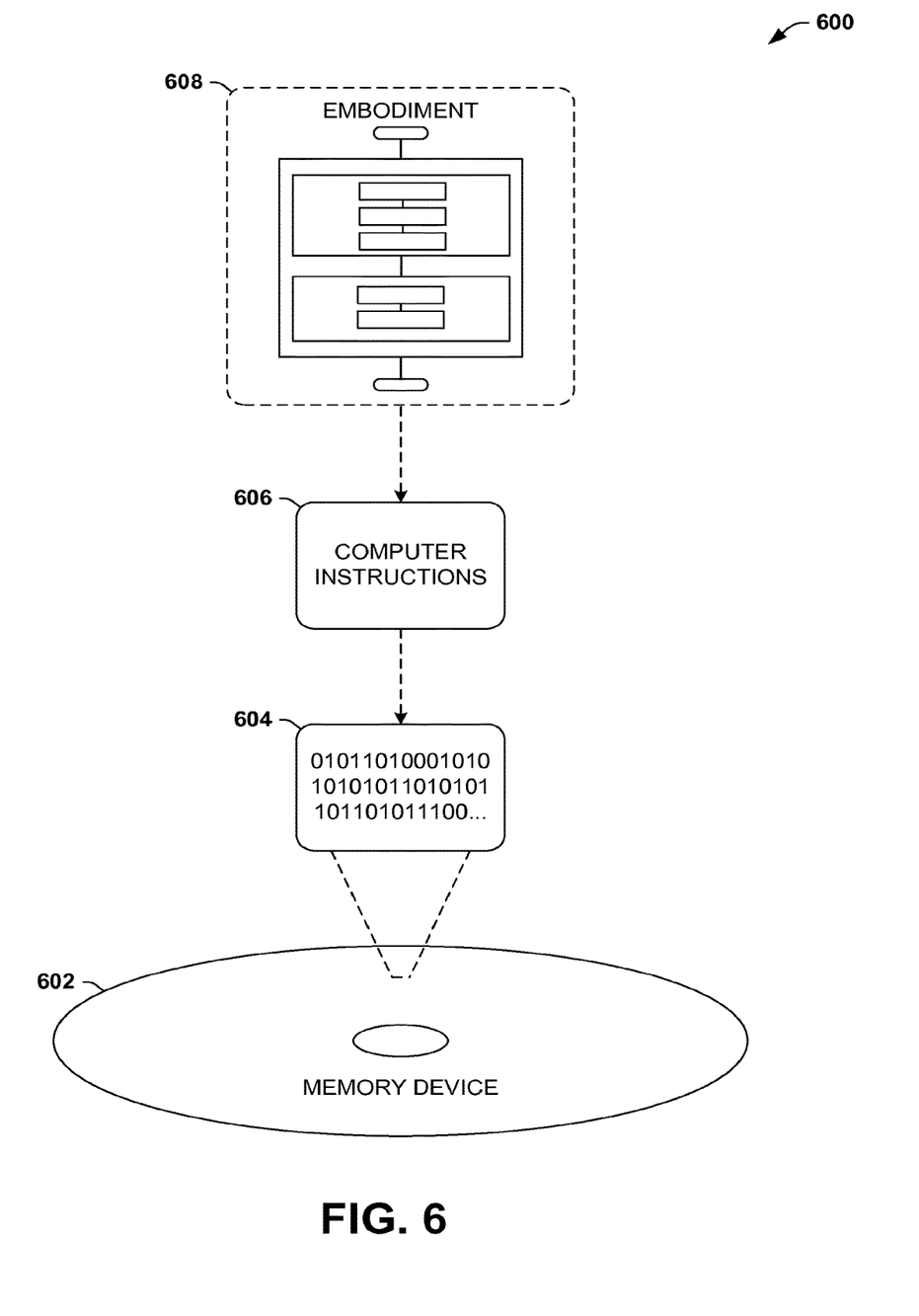
FIG. 6 is an illustration of an exemplary memory device storing executable instructions that embody one or more of the techniques presented herein.

FIG. 6 presents an illustration of an exemplary scenario 600 featuring an exemplary memory device 602 (e.g., a CD-R, DVD-R, or a platter of a hard disk drive), on which is encoded computer-readable data 604. The computer-readable data 604 in turn comprises a set of computer instructions 606 configured to operate according to the principles set forth herein. In one such embodiment, the processor-executable instructions 606 may be configured to implement a system for providing services 104 for individuals 102, such as the exemplary system 408 of FIG. 4. In another such embodiment, the processor-executable instructions 606 may be configured to perform a method 608 of providing services 104 for individuals 102, such as the exemplary method 500 of FIG. 5. Many such memory devices may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary system 408 of FIG. 4; the exemplary method 500 of FIG. 5; and/or the exemplary memory device 602 of FIG. 6) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized to achieve the configuration of a variety of devices 404, such as workstations, servers, laptops, tablets, mobile phones, game consoles, portable gaming devices, portable or non-portable media players, media display devices such as televisions, and appliances.

As a second variation of this first aspect, many types of services 104 provided by such techniques, including commercial services; financial services; educational services; social networks 116; health services; and advisory services.

As a third variation of this first aspect, many types of individual profiles 106 may be generated comprising many types of individual details 110, including the demographic details of the individual 102; the associations of the individual 102 with various other individuals, groups, and organizations; the financial status and/or credit record of the individual 102; the health record of the individual 102; the personal tastes of the individual 102; contact information of the individual 102; a browsing history 220 of the individual 102; a purchase history 208 of the individual 102; and a history of interactions between the individual 102 and other individuals, such as a record of messages exchanged between such individuals. Those of ordinary skill in the art may devise many such scenarios to which the techniques presented herein may be applicable.

D2. Supplemental Individual Information Requests and Usage

A second aspect that may vary among embodiments of these techniques relates to the requesting and usage of the supplemental individual information 304.

As a first variation of this second aspect, requests 316 for supplemental individual information 304 may be issued to the individual 102 in various ways. As a first example, the request 316 may be presented through a natural-language notification 312, complete with usage information 314 and a mechanism for asking additional questions. As a second example, the individual 102 may have indicated various types of individual consent through an automated interface (e.g., a personal information manager), and requesting the supplemental individual information 304 may involve presenting the request 316 to the automated interface.

As a second variation of this second aspect, if an individual 102 refuses to provide supplemental individual information 304 (e.g., refusing to provide individual consent to advance to a higher familiarity stage 704), the individual 102 may be notified that the service 104 is not available (e.g., if it is not possible to provide the service 104 to the individual 102 in a meaningful way absent the supplemental individual information 304). Alternatively, the service 104 may endeavor to fulfill the usage 402 using only the currently available individual details 110 in the individual profile 106. As a second such example, the service 104 may be configured to refrain from requesting the supplemental individual information 304 for subsequent usages of the service 104. As a third such example, if supplemental individual information 304 about the individual 102 is received that exceeds the familiarity level 310 established by the individual 102 with the service 104, the supplemental individual information 304 may be discarded and not added to the individual profile 106, and the service 104 may refrain from using any such supplemental individual information 304 exceeding the familiarity level 310 during provision of the service 104 to the individual 102. As a fourth such example, if the individual 102 expressed a reduced familiarity level 310 established with the service 104 (e.g., indicating that the individual 102 has become more sensitive to some information in the individual profile 106 and/or has lost trust in the service 104), the individual profile 106 may be reexamined in order to discard any individual information that exceeds the reduced familiarity level 310 established by the individual 102 with the service 104, and the service 104 may then be provided to the individual 102 according to the reduced familiarity level 310.

As a third variation of this second aspect, before requesting supplemental individual information 304, a service 104 may endeavor to maximize its utilization in the absence of the supplemental individual information 304. That is, if the individual profile 106 of the individual 102 is sufficient to satisfy a requested usage 402 of a service 104, an embodiment of these techniques may not request the supplemental individual information 304. For example, if an apartment search 208 reveals a search result 322 that is contingent both upon a non-student status 302 and a sufficiently trustworthy credit score, and the individual profile 106 of the individual 102 includes a student status 302 but does not include a credit score, the service 104 may not opt to request the credit score, as the current information in the individual profile 106 is sufficient to make this determination.

As a fourth variation of this second aspect, upon receiving supplemental individual information 304 that has been requested for a usage 402, a service 104 may endeavor to expedite the fulfillment of the usage 402 relating to the supplemental individual information 304. For example, a service 104 may be configured to present search results contingent upon the supplemental individual information 304 promptly upon receipt, and may indicate the relationship between the supplemental individual information 304 and the search results (e.g., indicating how a credit score that the individual 102 has disclosed has affected the search results, such as prequalifying the individual 102 for one or more apartments). Promptly using the supplemental individual information 304 to personalize the service 104 for the individual 102 may reassure the individual 102 that the disclosure of such supplemental individual information 304 is for the advantage of the individual 102 in providing a higher level of personalization of the service 104 for the individual 102.

As a fifth variation of this second aspect, the familiarity level 310 may be represented as a set of familiarity stages that respectively indicate the sensitivity and/or familiarity connoted by the disclosure of the individual detail 110. Additionally, the individual profile 106 may store a selected familiarity stage selected from a familiarity stage set, indicating a degree of familiarity of the relationship between the individual profile 106 (and the services 104 using it) and the individual 102. Requests for supplemental individual information 304 may be issued in various ways based upon the selected familiarity stage of the individual profile 106 and the familiarity stage of the requested supplemental individual information 304.

Figure 7:
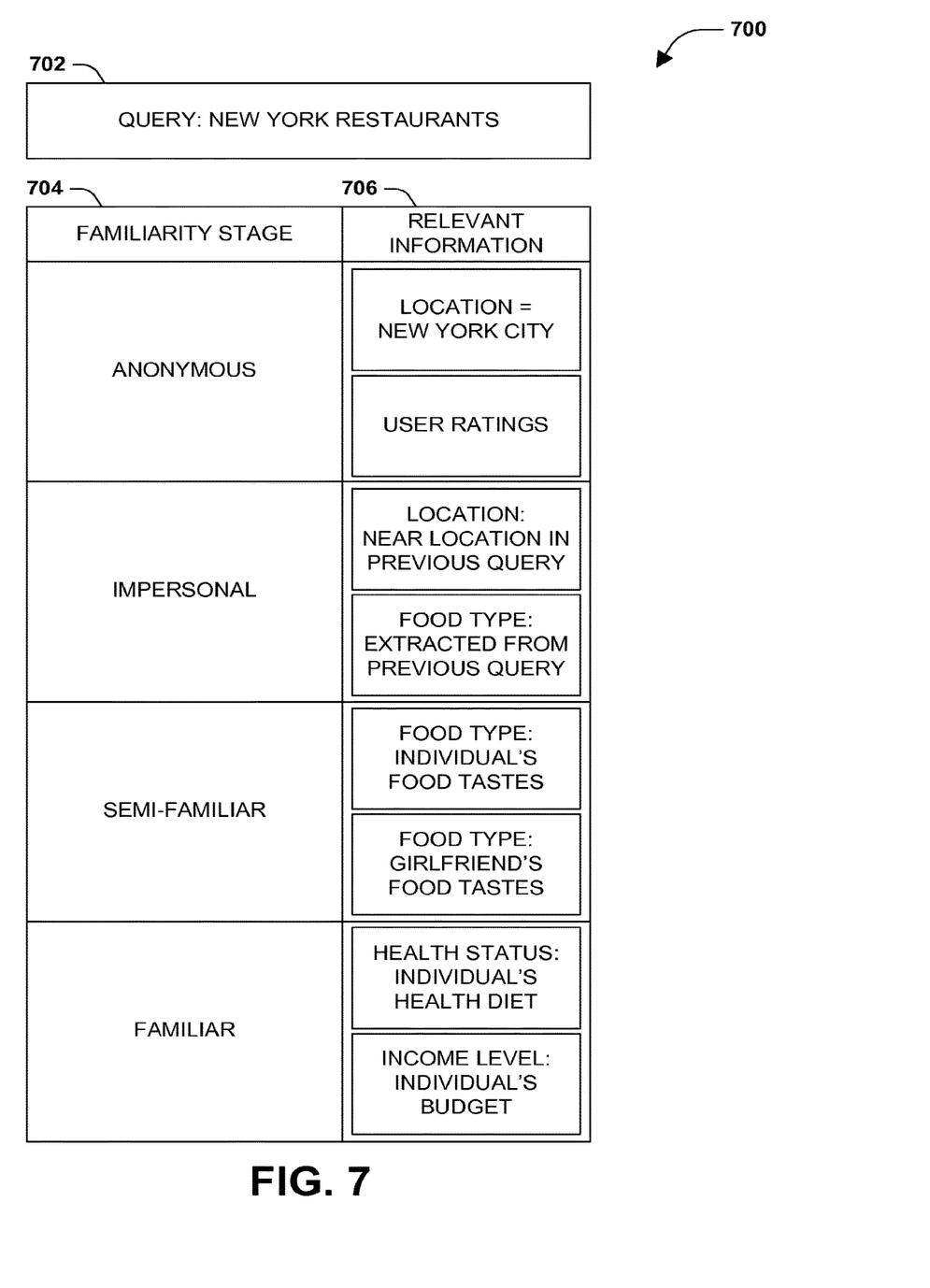
FIG. 7 is an illustration of an exemplary scenario featuring an exemplary set of familiarity stages usable in the provision of a personalized service in accordance with the techniques presented herein.

FIG. 7 presents an illustration of an exemplary scenario 700 featuring a query 702 that may be submitted by an individual 102 to a service 104. In this exemplary scenario 700, a set of familiarity stages 704 is defined, indicating the familiarity for which the individual 102 has provided individual consent to disclosure with the service 104 and/or individual profile 106, where respective familiarity stages 704 may define which portions of the individual profile 106 are used as relevant information 706 to fulfill the query 702. As a first example, if the individual profile 106 indicates a selected familiarity stage 704 of "anonymous" (indicating that no personal information is to be collected or used by the service 104), then the relevant information 706 for the query 702 may include only impersonal factors, such as a location identified in the query 702 and user ratings by other individuals 102. As a second example, if the individual profile 106 indicates a selected familiarity stage 704 of "impersonal" (indicating that personal information and inferences gleaned during the current interaction with the individual 102 may be utilized), the relevant information 706 may include both the "anonymous" relevant information 706, and also a current location of the individual 102 (e.g., detected by a global positioning system (GPS) receiver), and a food type in which the individual 102 expressed an interest in a previous query during this interaction. As a third example, if the individual profile 106 indicates a selected familiarity stage 704 of "semi-familiar" (indicating that non-sensitive information from the individual profile 106 of the individual 102 may be utilized), then the relevant information 706 utilized to fulfill the query 702 may include both the "anonymous" and "impersonal" relevant information 706, and also the individual's food tastes specified in the individual profile 106, and information about a girlfriend's food tastes (noting that the individual 102 may be requesting a recommendation for dinner with a girlfriend who also has an individual profile 106). As a fourth example, if the individual profile 106 indicates a selected familiarity stage 704 of "familiar" (indicating that sensitive information from the individual profile 106 may also be used as relevant information 706 for the query 702), then the results may also be selected based on the individual's health status and diet (e.g., if the individual profile 106 of the 102 indicates high blood pressure, the query 702 may prioritize the recommendation of restaurants featuring heart-healthy cuisine) and the individual's income level and budget. In this manner, the familiarity stage 704 indicating the degree of familiarity between the individual 102 and the service 104 may be selected and utilized to fulfill the requested usage 402 of the service 104 and the resulting level of personalization.

Many additional variations may involve the selection of a familiarity stage. As a sixth variation of this second aspect, a device 404 may be configured to prioritize respective usages 402 of the service 104 according to the familiarity stage of the usage 402. Between a first usage 402 and a second usage 402 involving a higher familiarity stage 704 than that of the first usage 402, the device 404 may be configured to perform the first usage 402 before the second usage 402 (e.g., completing the lower-sensitivity usages 402 and presenting the results to the individual 102 before requesting supplemental individual information 304 related to the higher familiarity stage 704 of the second usage 402).

As a seventh variation of this second aspect, a device 404 may be configured to, upon determining that a usage 402 involves supplemental individual information 304 that is associated with a familiarity stage 704 beyond the selected familiarity stage 704 of the individual profile 106 (e.g., a usage 402 that is desirably fulfilled using supplemental individual information 304 that is beyond the highest level of familiarity thus far established between the individual 102 and the service 104), the device 404 may request from the individual 102 an individual consent to advance the selected familiarity stage 702 of the individual profile 106 to the higher familiarity stage 704 pertaining to the usage 402 of the service 104. For example, if the individual 102 requests a usage 402 involving sensitive information, such as an evaluation of a health condition, but has previously shared only non-sensitive information within a "personal" familiarity stage 704, the service 104 may first verify that the individual 102 has provided individual consent to moving to a "familiar" familiarity stage 704. Upon receiving such individual consent, the device 402 may advance the selected familiarity stage 704 of the individual profile 106 to the higher familiarity stage. Additionally, upon advancing to the higher familiarity stage 704, the device 402 may be less conservative during subsequent requests for supplemental individual information 304 that is within the higher familiarity stage 704; e.g., once receiving individual consent from the individual 102 to receive and utilize some confidential financial information, such as a credit score, the service 104 may again seek advancement to the higher familiarity stage 704 before requesting even more sensitive financial information, such as annual income, but may be less hesitant to request other financial information of the same or lower sensitivity, such as whether the individual 102 holds a credit card.

As an eighth variation of this second aspect, respective services 104 may be associated with an individual profile domain (e.g., a particular topic), and may utilize the individual details 110 of the user input 108 within the individual profile domain. The individual profile 106 may also identify different selected familiarity stages for different individual profile domains of the individual profile 106. For example, the individual profile 106 may include individual details 110 about the individual's health record, the individual's financial status, and the individual's personal relationships, and the individual 102 may have different selected familiarity stages 704 about each individual profile domain (e.g., the individual 102 may be comfortable sharing confidential financial information with services 104, may be comfortable sharing only personal relationship information with the services 104, and may not be comfortable sharing any health record information with the services 104). Accordingly, the device 406 may expose the individual profile 106 to a service 104 by first identifying the selected familiarity stage 704 for the individual profile domain involved in the usage 402 of the service 104, and then requesting from the individual 102 only supplemental individual information 304 that is within the selected familiarity stage 704 of the individual profile domain of the service 104.

As a ninth variation of this second aspect, the individual 102 may be presented with an option to advance from a familiarity stage to a higher familiarity stage only for a particular usage 314 of a particular service 104. For example, the individual 102 may be willing to disclose sensitive information, such as a credit score, only during a single interaction with a single service 104. Accordingly, an individual consent to advance the selected familiarity stage to a higher familiarity stage may be applied prior to providing the service 104, and upon completing the usage 314 of the service 104, the selected familiarity stage may return from the higher familiarity stage. In this manner, the privacy interests of the individual 102 may be safeguarded while temporarily achieving a higher familiarity stage with the individual 102 in a selected manner.

As a tenth variation of this second aspect, a device 402 may infer an individual detail 110 about an individual 102, e.g., based on individual behavior, expressions, purchases, or demographics. For example, an individual profile generator may included an inferred that, upon inferring an individual detail about the individual 102, stores the individual detail in the individual profile 106 of the individual 102. In accordance with the techniques presented herein, such inferences may be collected and stored only in accordance with the familiarity level 310 established by the individual 102 with the service 104. Upon inferring an individual detail that is within the familiarity level 310, the inferrer may store the individual detail in the individual profile 106. Conversely, upon inferring an individual detail that exceeds the familiarity level 310, the inferrer may discard the individual detail, and may refrain from allowing the service 104 to use the individual detail.

Further variations in this second aspect pertain to the manner of inferring such individual details within the familiarity level 310 established by the individual 102 with the service 104. For example, an interaction with the individual 102 may include a recommendation that is associated with an inference of an individual detail 110 that is within a selected familiarity stage 704 of the individual profile 106. If individual interest by the individual 102 in the recommendation is detected, the individual detail 110 may be added to the individual profile 104 in accordance with the selected familiarity stage 704. For example, in a usage of a service 104 comprising a restaurant search, a set of search options may be presented that provide various capabilities, where a personalized option that is associated with an individual detail that has been inferred about the individual 102 may be included among one or more non-personalized options that are not associated with the individual detail. A detection of higher individual interest in the personalized option than in the non-personalized options may facilitate an assurance that the inference is correct, and the inference may be added to the individual profile 106 of the individual 102. These and other variations in the development of the individual profile 106 in accordance with the familiarity level 310 established between the individual 102 and the service 104 may be included in various embodiments of the techniques presented herein.

E. Computing Environment

Figure 8:
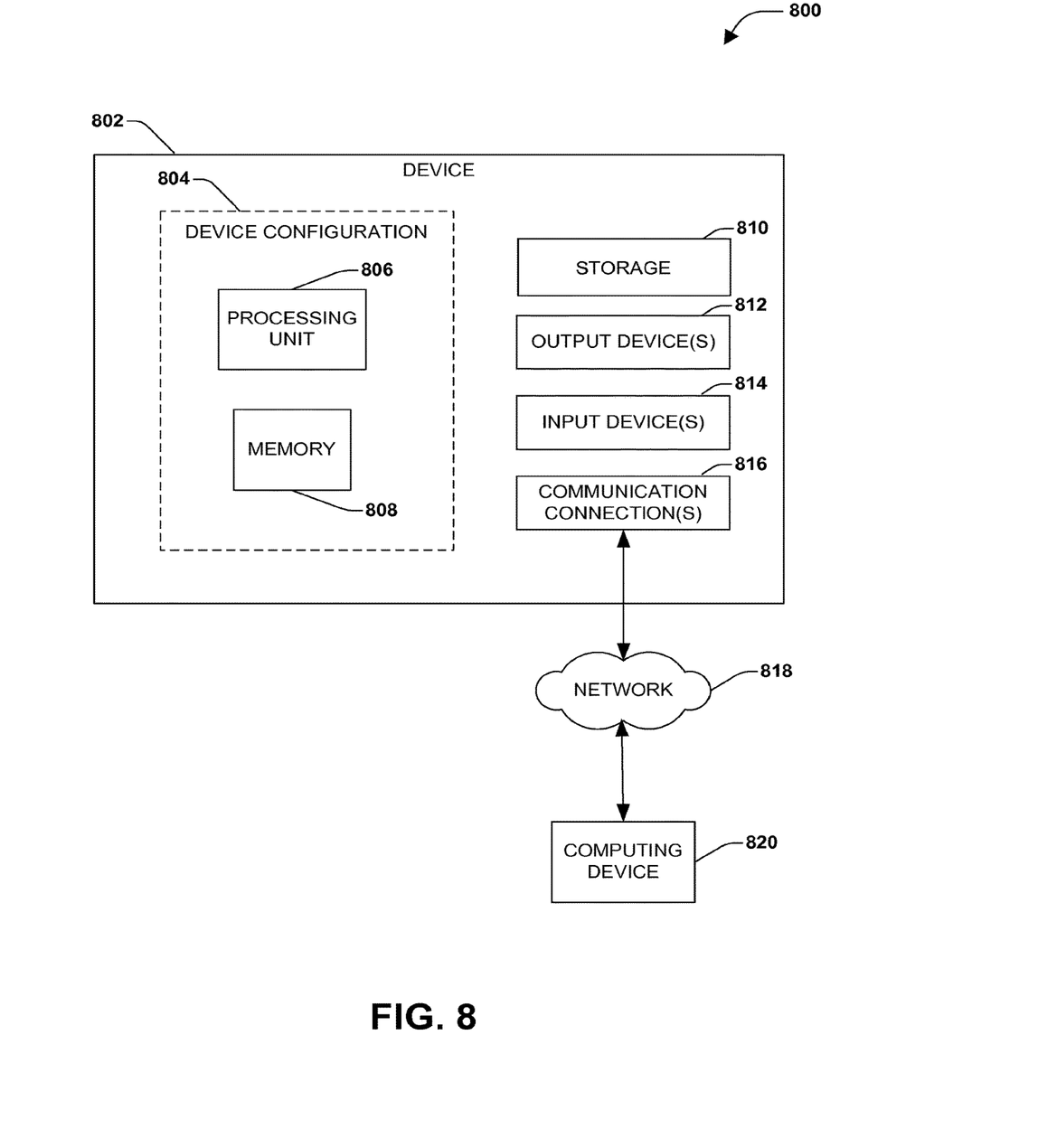
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer-readable instructions" being executed by one or more computing devices. Computer-readable instructions may be distributed via computer-readable media (discussed below). Computer-readable instructions may be implemented as program modules, such as functions, objects, Application Programming Interfaces (APIs), data structures, and the like, that perform particular tasks or implement particular abstract data types. Typically, the functionality of the computer-readable instructions may be combined or distributed as desired in various environments.

FIG. 8 illustrates an example of a system 800 comprising a computing device 802 configured to implement one or more embodiments provided herein. In one configuration, computing device 802 includes at least one processing unit 806 and memory 808. Depending on the exact configuration and type of computing device, memory 808 may be volatile (such as RAM, for example), non-volatile (such as ROM, flash memory, etc., for example) or some combination of the two. This configuration is illustrated in FIG. 8 by dashed line 804.

In other embodiments, device 802 may include additional features and/or functionality. For example, device 802 may also include additional storage (e.g., removable and/or non-removable) including, but not limited to, magnetic storage, optical storage, and the like. Such additional storage is illustrated in FIG. 8 by storage 810. In one embodiment, computer-readable instructions to implement one or more embodiments provided herein may be in storage 810. Storage 810 may also store other computer-readable instructions to implement an operating system, an application program, and the like. Computer-readable instructions may be loaded in memory 808 for execution by processing unit 806, for example.

The term "computer-readable media" as used herein includes memory devices that, as a class of technology, categorically excludes electromagnetic signals and all non-statutory embodiments. Such memory devices may be volatile and/or nonvolatile, removable and/or non-removable, and may involve various types of physical devices storing computer-readable instructions or other data. Examples of such memory devices include RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 802 may also include communication connection(s) 816 that allows device 802 to communicate with other devices. Communication connection(s) 816 may include, but is not limited to, a modem, a Network Interface Card (NIC), an integrated network interface, a radio frequency transmitter/receiver, an infrared port, a USB connection, or other interfaces for connecting computing device 802 to other computing devices. Communication connection(s) 816 may include a wired connection or a wireless connection. Communication connection(s) 816 may transmit and/or receive communication media.

The term "computer-readable media" also includes communication media, as a distinct and mutually exclusive category of computer-readable media than memory devices. Communication media typically embodies computer-readable instructions or other data in a "modulated data signal" such as a carrier wave or other transport mechanism and includes any information delivery media. The term "modulated data signal" may include an electromagnetic signal that has one or more of its characteristics set or changed in such a manner as to encode information in the signal.

Device 802 may include input device(s) 814 such as keyboard, mouse, pen, voice input device, touch input device, infrared cameras, video input devices, and/or any other input device. Output device(s) 812 such as one or more displays, speakers, printers, and/or any other output device may also be included in device 802. Input device(s) 814 and output device(s) 812 may be connected to device 802 via a wired connection, wireless connection, or any combination thereof. In one embodiment, an input device or an output device from another computing device may be used as input device(s) 814 or output device(s) 812 for computing device 802.

Components of computing device 802 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 802 may be interconnected by a network. For example, memory 808 may be comprised of multiple physical memory units located in different physical locations interconnected by a network.

Those skilled in the art will realize that storage devices utilized to store computer-readable instructions may be distributed across a network. For example, a computing device 820 accessible via network 818 may store computer-readable instructions to implement one or more embodiments provided herein. Computing device 802 may access computing device 820 and download a part or all of the computer-readable instructions for execution. Alternatively, computing device 802 may download pieces of the computer-readable instructions, as needed, or some instructions may be executed at computing device 802 and some at computing device 820.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer-readable instructions stored on one or more memory devices, where the execution of such instructions by a computing device causes the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of adapting provision of a service, the method comprising:
   identifying supplemental individual information that both relates to the usage of the service and is absent from a profile of an individual, the supplemental information having a familiarity level relating to a level of privacy with which the individual consents to dispense when engaging the service;
   identifying a privacy level threshold established by the individual with the service, the privacy level threshold reflecting a level of privacy with which the individual consents to dispense when engaging the service;
   determining whether the familiarity level of the supplemental information satisfies the privacy level threshold, the supplemental individual information satisfying the privacy level threshold if previously disclosed information to which the individual had consented shares the familiarity level; and
   requesting, if a result of the determining is affirmative, the supplemental individual information from the individual.

2. The method of claim 1, wherein a result of the determining is affirmative when the supplemental individual information is on a comparable level of familiarity with that of previously disclosed information.

3. The method of claim 1, further comprising:
receiving requested supplemental individual information;
determining whether the received supplemental information exceeds the threshold level established by the individual with the service; and
discarding the supplemental individual information when a result of the determining whether the received supplemental information exceeds the threshold level is affirmative.

4. The method of claim 1, further comprising maximizing the usage of the service for the individual in the absence of the supplemental individual information, before the requesting.

5. The method of claim 1, wherein:
the profile is structured according to at least two familiarity stages, and
the method further comprises storing the higher familiarity stage in the profile, upon receiving from the individual an individual consent to advance to a higher familiarity stage; and
the requesting further comprises requesting from the individual only the supplemental individual information that is within the higher familiarity stage of the individual profile.

6. The method of claim 5, wherein the familiarity level is represented as a familiarity stage selected from a familiarity stage set comprising:
an anonymous familiarity stage comprising an absence of information about the individual;
an impersonal familiarity stage comprising information disclosed by the individual in a current interaction;
a semi-familiar familiarity stage comprising non-sensitive information about the individual; and
a familiar familiarity stage comprising sensitive information about the individual.

7. The method of claim 5, further comprising:
prioritizing respective usages of the service according to the familiarity stage of the usage; and
between a first usage and a second usage involving a higher familiarity stage than the familiarity stage of the first usage, performing the first usage before the second usage.

8. The method of claim 5, further comprising, upon identifying supplemental individual information relating the usage of the service and having a familiarity stage that is not within the selected familiarity stage of the individual profile:
requesting, from the individual, an individual consent to advance the selected familiarity stage to a higher familiarity stage of the usage of the service; and
advancing the selected familiarity stage to the higher familiarity stage of the usage of the service, upon receiving the individual consent from the individual.

9. The method of claim 5, wherein:
respective services are associated with an individual profile domain;
the profile further comprises a selected familiarity stage for respective individual profile domains of the individual profile;
the requesting the supplemental individual information further comprises:
identifying the selected familiarity stage of the individual profile domain of the service; and
requesting from the individual the supplemental individual information within the selected familiarity stage of the individual profile domain of the service; and
each individual profile domain is a topic with associated related information.

10. A system for providing a service to an individual having a profile specifying a familiarity threshold established by the individual with the service, the system comprising:
a user interface that informs the individual of usage of supplemental individual information by the service; and
a service informant that, upon receipt of a request for a usage of a service with a profile involving supplemental individual information that is absent from the profile:
determines whether a familiarity level of the supplemental individual information is less than or equal to the familiarity threshold established by the individual, the familiarity threshold established by the user reflecting a comfort level of the individual with sharing information when engaging the service, the familiarity level of the supplemental individual information being less than or equal to the familiarity threshold established by the individual if information of which the individual previously consented to disclose shares the familiarity level of the supplemental information; and
requests, if a result of the determining is affirmative, the supplemental individual information from the individual.

11. The system of claim 10, wherein the service informant, upon receiving requested supplemental individual information with a familiarity level that is higher than the familiarity threshold, refrains from using the supplemental individual information to provide the service for the individual.

12. The system of claim 10, further comprising an individual profile generator that, upon receiving supplemental individual information with a familiarity level that is lower than the familiarity threshold, stores the supplemental individual information in the individual profile.

13. The system of claim 12, wherein the individual profile generator comprises an inferrer that:
infers an individual detail about the individual that is within a familiarity level that is lower than the familiarity threshold; and
stores the individual detail in the individual's profile.

14. The system of claim 13, wherein the user interface infers the individual detail about the individual by:
presenting in an option set
a personalized option that is associated with the individual detail, and
a non-personalized option that is not associated with the individual detail; and
detecting higher individual interest of the individual in the personalized option than in the non-personalized option.

15. A memory device storing instructions that, when executed on a processor of a computer, causes the execution of a method of adapting provision of a service, the method comprising:
identifying supplemental individual information that both relates to the usage of the service and is absent from a profile of an individual, the supplemental information having a familiarity level relating to a level of privacy with which the individual consents to dispense when engaging the service;
identifying a privacy level threshold established by the individual with the service, the privacy level threshold reflecting a level of privacy with which the individual consents to dispense when engaging the service;

determining whether the familiarity level of the supplemental information satisfies the threshold privacy level threshold, the supplemental individual information satisfying the privacy level threshold if previously disclosed information to which the individual had consented shares the familiarity level; and requesting, if a result of the determining is affirmative, the supplemental individual information from the individual.

16. The memory device of claim 15, wherein the profile includes a set of familiarity stages, each familiarity stage:

indicating a respective familiarity for which the individual has provided consent to disclose information with the service; and defining which portions of the profile that may be shared with the service in response to the requesting.

17. The memory device of claim 15, wherein the method further comprises, upon receiving supplemental individual information about the individual that is not within the current familiarity level:

discarding received supplemental individual information; and refraining from using received supplemental individual information while providing the service for the individual.

18. The memory device of claim 15, wherein the method further comprises, upon receiving from the individual a refusal to provide the supplemental individual information in response to the requesting, providing the service for the individual without the received supplemental individual information.

19. The memory device of claim 15, wherein the method further comprises, upon detecting a reduced familiarity level established by the individual with the service:

reexamining the profile to identify an individual detail that exceeds the reduced familiarity level; and removing the individual detail from the profile.

20. The memory device of claim 15, further comprising:

upon determining that the supplemental individual information is not within the current familiarity level, requesting consent from the individual to advance to a higher familiarity stage that encompasses the supplemental individual information for only a specified requested usage of the service;

providing only the specified requested usage of the service; and returning to a lower familiarity stage, after the providing.

21. The method of claim 1, wherein the requesting includes options for disclosing and not disclosing the supplemental individual information.

* * * * *